US006414324B1

(12) United States Patent
Colyott et al.

(10) Patent No.: US 6,414,324 B1
(45) Date of Patent: Jul. 2, 2002

(54) METHOD OF PREPARING DETECTION MATERIALS FOR USE IN UV DETECTION USING PHOTOTRANSFERRED THERMOLUMINESCENCE

(75) Inventors: Leslie E. Colyott; Mark S. Akselrod; Stephen W. S. McKeever, all of Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 0 days.

(21) Appl. No.: 09/309,315

(22) Filed: May 11, 1999

Related U.S. Application Data (60) Provisional application No. 60/085,418, filed on May 13, 1998.

(51) Int. Cl.$^7$ .............................. G01J 5/00; G01J 1/58
(52) U.S. Cl. ............................ 250/484.5; 250/484.4; 250/484.3
(58) Field of Search ........................ 250/484.2, 483.1, 250/484.4, 484.5, 473.1, 458.1, 459.1, 461.1, 484.3

(56) References Cited

U.S. PATENT DOCUMENTS

| | | | |
|---|---|---|---|
| 3,728,543 A | | 4/1973 | Buckman et al. |
| 3,924,135 A | | 12/1975 | Dhar et al. |
| 5,569,927 A | * | 10/1996 | Miller ...................... 250/484.5 |
| 5,610,405 A | * | 3/1997 | Inushima et al. ........... 250/372 |
| 5,892,234 A | | 4/1999 | McKeever et al. |
| 5,962,857 A | | 10/1999 | McKeever et al. |
| 6,249,004 B1 | * | 6/2001 | Miller ...................... 250/474.1 |

FOREIGN PATENT DOCUMENTS

DE  27 42 554 A1 * 3/1978 ............ C09K/11/12

OTHER PUBLICATIONS

Akselrod et al. "A Thin–Layer α–Al$_2$O$_3$:C Beta TL Detector." *Radiation Protection Dosimetry*: vol. 66, No. 1–4, 1996, pp. 105–110.
Akselrod et al. "Deep Traps in Highly Sensitive α–Al$_2$O$_3$:C TLD Crystals." *Nucl. Tracks Radiat. Meas.*: vol. 21, No. 1, 1993, pp. 143–146.
Akselrod et al. "Highly Sensitive Thermoluminescent Anion–Defective α–Al$_2$O$_3$:C Single Crystal Detectors." *Radiation Protection Dosimetry*: vol. 32, No. 1, 1990, pp. 15–20.
Akselrod et al. "Thermoluminescent and Exoemission Properties of New High–Sensitivity TLD α–Al$_2$O$_3$:C Crystals." *Radiation Protection Dosimetry*: vol. 33, No. 1/4, 1990, pp. 123–126.
Barnes et al. "Photomorphogenic Effects of UV–B Radiation on Plants: Consequences for Light Competition." *J. Plant Physiol.*: vol. 148, 1996, pp. 15–20.

Berkelaar et al. "The Influence of Photosynthetically Active Radiation on the Effects of Ultraviolet–B Radiation on *Arabidopsis thaliana*." *Photochemistry and Photobiology*: vol. 64, No. 1, 1996, pp. 110–116.
Blanke, Michael M. "Transmission of UV–Irradiance into Nectarine Fruit." *Angew. Bot.*: vol. 70, 1996, pp. 76–77.
Brash, Douglas E. "UV Mutagenic Photoproducts in *Escherichia coli* and Human Cells: A Molecular Genetics Perspective on Human Skin Cancer." *Photochemistry and Photobiology*: vol. 48, No. 1, 1988, pp. 59–66.
Buckman et al. "Photostimulated Thermoluminescence of Lithium Fluoride as an Ultraviolet Radiation Dosimeter." *Health Physics*: vol. 31, Dec. 1976, pp. 501–504.
Chakrabarti et al. "U.V. Induced Trapping in Powder and in Sintered CaSO$_4$:Tm and CaSO$_4$:Dy." *Radiation Protection Dosimetry*: vol. 33, No. 1/4, 1990, pp. 35–38.
Chang et al. "Direct Thermoluminescence of Sintered ZrO$_2$ Pellets Induced by Ultraviolet Radiation." *Nucl. Tracks Radiat. Meas.*: vol. 20, No. 3, 1992, pp. 511–516.
Chang et al. "Influence of the Sintering Process of ZrO$_2$ Pellets on Thermoluminescence Induced by Ultraviolet Radiation." *Radiation Protection Dosimetry*: vol. 47, Nos. 1/4, 1993, pp. 169–172.
Colyott et al. "Phototransferred Thermoluminescence in α–Al$_2$O$_3$:C." *Radiation Protection Dosimetry*: vol. 65, Nos. 1/4, 1996, pp. 263–266.
Day et al. "Changes in growth and pigment concentrations with leaf age in pea under modulated UV–B radiation field treatments." *Plant, Cell and Environment*: vol. 19, 1996, pp. 101–108.
Driscoll et al. "Multiple Dose Re–Assessment of Lithium Fluoride by the Ultra–Violet Phototransferred Thermoluminescence Technique" *Radiation Protection Dosimetry*: vol. 6, No. 1–4, pp. 117–120.
Driscoll et al. "Solar UVR Measurements." *Radiation Protection Dosimetry*: vol. 64, No. 3, 1996, pp. 179–188.

(List continued on next page.)

*Primary Examiner*—Constantine Hannaher
*Assistant Examiner*—Albert Gagliardi
(74) *Attorney, Agent, or Firm*—Fellers, Snider, Blankenship, Bailey & Tippens, P.C.

(57) ABSTRACT

The instant invention teaches a method of preparing a luminescent detecting material for use in UV dosimetry which utilizes phototransferred luminescence. The detecting material has a set of shallow dosimetry traps for trapping electronic charge carriers, which are thermally released upon heating to a first temperature, and a set of deep traps for trapping electronic charge carriers, which charge carriers are released upon heating to a second temperature. The detecting material is prepared by irradiating the detecting material to fill the shallow and deep traps with charge carriers, heating the material to release charge carriers from the shallow traps, and then cooling the material. When the detecting material is subsequently exposed to ultraviolet light a proportion of charge carriers will be released from the deep traps to be retrapped in the shallow traps, thereby allowing for the measurement of phototransferred luminescence by thermal or optical stimulation.

14 Claims, 5 Drawing Sheets

OTHER PUBLICATIONS

Fausto et al. "Studies on TL of LiF: Mg and/or Cu Exposed to Gamma and UV Rays." *Radiation Protection Dosimetry*: vol. 51, No. 3, 1994, pp. 211–216.

Feldheim et al. "The effects of increased UV–B radiation on growth, pollination success, and lifetime female fitness in two Brassica species." *Oecologia*: vol. 106, 1996, pp. 284–297.

Fiscus et al. "Response of Soybean Bulk Leaf Water Relations to Ultraviolet–B Irradiation." *J. Plant Physiol.*: vol. 148, 1996, pp. 63–68.

Francis et al. "The Effect of Temperature and Wavelength on Production and Photolysis of a UV–Induced Photosensitive DNA Lesion Which Is Not Repaired in Xeroderma Pigmentosum Variant Cells." *Photochemistry and Photobiology*: vol. 48, No. 1, pp. 67–71.

Kerr et al. "Evidence for Large Upward Trends of Ultraviolet–B Radiation Linked to Ozone Depletion." *Science*: vol. 262, Nov. 12, 1993, pp. 1032–1034.

Kim et al. "Enhanced UV–B radiation has little effect on growth, $\delta^{13}C$ values and pigments of pot–grown rice (*Oryza sativa*) in the field." *Physiologia Plantarum*: vol. 96, 1996, pp. 1–5.

Lubin et al. "Effects of clouds and stratospheric ozone depletion on ultraviolet radiation trends." *Nature*: vol. 377, Oct. 26, 1995, pp. 710–713.

Lyman, Theodore. "The Transparency of the Air Between 1100 and 1300A." *Physical Review*: vol. 48, Jul. 15, 1935, pp. 149–151.

Madronich et al. "Changes in Ultraviolet Radiation Reaching the Earth's Surface." *Ambio*: vol. 24, No. 3, May 1995, pp. 143–152.

Miller et al. "Comparisons of observed ozone trends and solar effects in the stratosphere through examination of ground–based Umkehr and combined solar backscattered ultraviolet (SBUV) and SBUV 2 satellite data." *Journal of Geophysical Research*: vol. 101, No. C4, Apr. 20, 1996, pp. 9017–9021.

Morison, Warwick L. "Effects of Ultraviolet Radiation on the Immune System in Humans." *Photochemistry and Photobiology*: vol. 50, No. 4, 1989, pp. 515–524.

Moscovitch et al. "Light Induced Fading in $\alpha$–$Al_2O_3$:C." *Radiation Protection Dosimetry*: vol. 47, No. 1/4, 1993, pp. 251–253.

Musk, J.H. "Time–Dependent and Light–Induced Fading in Victoreen Model 2600–80 Alyminium Oxide Thermoluminescence Dosemeters." *Radiation Protection Dosimetry*: vol. 47, No. 1/4, 1993, pp. 247–249.

Nolan et al. "European Commission research on the fluxes and effects of environmental UVB radiation." *Photochemistry and Photobiology B: Biology*: vol. 31, 1995, pp. 3–7.

Oberhofer, M. "Dosimetry of Non–Ionising Radiation." *Radiation Protection Dosimetry*: vol. 6, No. 1–4, pp. 109–112.

Okuno et al. "U.V. Induced Thermoluminescence on Natural Calcium Fluoride." *Health Physics*: vol. 23, Sep. 1972, pp. 377–382.

Olszyk et al. "UV–B Effects on Crops: Response of the Irrigated Rice Ecosystem." *J. Plant Physiol.*: vol. 148, 1996, pp. 26–34.

Parrish et al. "Erythema and Melanogenesis Action Spectra of Normal Human Skin." *Photochemistry and Photobiology*: vol. 36, 1982, pp. 187–191.

Potiens, Jr. et al. "Ultraviolet and Laser Radiation Dosimetry Using Photogransferred Thermoluminescence in $CaSO_4$:Dy." *Radiation Protection Dosimetry*: vol. 66, Nos. 1–4, 1996, pp. 95–96.

Quintern et al. "Continuous dosimetry of the biologically harmful UV–radiation in Antarctica with the biofilm technique." *Photochemistry and Photobiology*: vol. 22, No. 1, 1994, pp. 59–66.

Rau et al. "Sensitivity ot UV–B of Plants Growing in Different Altitudes in the Alps." *J. Plant Physiol.*: vol. 148, 1996, pp. 21–25.

Setlow, R.B. "The Wavelengths in Sunlight Effective in Producing Skin Cancer: A Theoretical Analysis." *Proc. Nat. Acad. Sci. USA*: vol. 71, No. 9, Sep. 1974, pp. 3363–3366.

Sliney, David H. "UV radiation ocular exposure dosimetry." *Photochemistry and Photobiology B: Biology*: vol. 31, 1995, pp. 69–77.

Su et al. "The Effect of LiF in $Gd_2O_3$:Eu, $Y_2O_3$:Eu, $ZrO_2$:Zn and $ZrO_2$:Er on UV Induced Thermoluminescence." *Radiation Protection Dosimetry*: vol. 65, No. 1–4, 1996, pp. 89–92.

Su et al. "UV Attenuation Coefficient in Water Determined by Thermoluminescence Detector." *Radiation Measurements*: vol. 26, No. 1, 1996, pp. 83–86.

Taylor et al. "Effect of Ultraviolet Radiation on Cataract Formation." *The New England Journal of Medicine*: vol. 319, No. 22, Dec. 1, 1988, pp. 1429–1433.

Teramura, Alan H. "Effects of ultraviolet–B radiation on the growth and yield of crop plants." *Physiol. Plant.*: vol. 58, 1983, pp. 415–427.

Urbach, Frederick. "Potential Effects of Altered Solar Ultraviolet Radiation on Human Skin Cancer." *Photochemistry and Photobiology*: vol. 50, No. 4, 1989, p. 507–513.

Walker et al. "The Wavelength Dependence of Light–Induced Fading of Thermoluminescence from $\alpha$–$Al_2O_3$:C." *Radiation Measurements*: vol. 26, No. 5, 1996, pp. 711–718.

Webb, Ann R. "Measuring UV radiation: a discussion of dosimeter properties, uses and limitations." *Photochemistry and Photobiology B: Biology*: vol. 31, 1995, pp. 9–13.

Xiong et al. "Screening of Freshwater Algae (Chlorophyta, Chromophyta) for Ultraviolet–B Sensitivity of the Photosynthetic Apparatus." *J. Plant Physiol.*: vol. 148, 1996, pp. 42–48.

Yeh et al. "Ultraviolet Radiation Measurement with Neutron Pre–Irradiated Thermoluminescence Dosemeters." *Radiation Protection Dosimetry*: vol. 47, No. 1/4, 1993, pp. 689–692.

Yeh et al. "UV Inducted Thermoluminescence in Rare Earth Oxide Doped Phosphors: Possible Use for UV Dosimetry." *Radiation Protection Dosimetry*: vol. 65, No. 1–4, 1996, pp. 359–362.

\* cited by examiner

METHOD OF PREPARING DETECTION MATERIALS FOR USE IN UV DETECTION USING PHOTOTRANSFERRED THERMOLUMINESCENCE

RELATED APPLICATIONS

This application claims the benefit of U.S. Provisional Application No. 60/085,418 filed May 13, 1998, the disclosure of which is incorporated herein by reference.

STATEMENT REGARDING FEDERALLY SPONSORED RESEARCH

This instant invention was partially supported through grants from the State of Oklahoma and the National Science Foundation Oklahoma EPSCoR (contract number EPS 9550478). The U.S. government may have rights in this invention.

TECHNICAL FIELD

This invention relates to the general subject of ultraviolet radiation detection and, more specifically, to methods and devices for detection and measurement of exposure to ultraviolet-B radiation, wherein the amount of exposure is measured using either thermoluminescence or optically stimulated luminescence from $\alpha$-$Al_2O_3$:C.

BACKGROUND OF INVENTION

Atmospheric ozone is generally considered to absorb all but approximately 1% of wavelengths below about 320 nm. Recent evidence of ozone depletion in the stratosphere, however, has generated interest in the biological impact on plants and animals resulting from increased exposure to wavelengths below 320 nm. This has created the need for ultraviolet (UV) radiation dosimetry for wavelengths in the UVB region of the electromagnetic spectrum, namely from 320 nm to 280 nm. Specifically, in order to search for possible links between enhanced UVB exposure and potential DNA damage in plants and/or animals the need for a small, portable, integrating UVB dosimeter has arisen. Additionally, the ideal device should also be unaffected by variations in ambient temperatures and by humidity and should be a passive—as opposed to an electronic or active—device, i.e., a device that does not require electrical power while it is operating.

One example of the current state-of-the-art in passive UVB dosimeters is one based on biological indicators such as *Bacillus subtilis,* pre-Vitamin D and bacteriophage 77. (See, for example, Quintern, L. E., Puskeppeleitm M., Rainer, P., Weber, S., El Naggar, S., Escweiler, U., and Horneck, G. *Continuous Dosimetry of the Biologically Harmful UV-Radiation in Antarctica with the Biofilm Technique,* in Photochem. Photobiol. B, 22, 59–66 (1994), the disclosure of which is incorporated herein by reference). These sorts of dosimeters are small in size, portable, do not need a power source, and have a linear response to increasing radiation.

Another approach to UV dosimetry measurement involves the use of thermoluminescence (TL). Thermoluminescence is the luminescence emitted from a suitable phosphor when the phosphor is heated following exposure to radiation. The intensity of the TL emitted is a measure of the dose of the absorbed radiation. For UV dosimetry, two approaches are generally used. The first approach is to expose the material directly to UV and then to heat the phosphor immediately after this exposure, yielding a TL signal which is related to the dose of absorbed UV radiation. The alternative approach is to pre-treat the sample by irradiating it with ionizing radiation (such as gamma or beta radiation) which places electronic charge into metastable charge centers (or "defects") within the phosphor's crystal lattice. After the pre-treatment, the sample is exposed to UV radiation, which transfers the electronic charge into defect centers that can be directly stimulated by subsequently heating the sample. During heating, a phototransferred TL (or PTTL) signal is recorded, the intensity of which—for a given gamma or beta radiation dose—is proportional to the UV exposure. Whether the TL or PTTL approach is used, the sensitivity of the detector to the different wavelengths of UV depends critically upon the material chosen as the phosphor. Previous work by the instant inventors and others (see, for example, Colyott, L. E., Akselrod, M. S. and McKeever, S. W. S., *Phototransferred Thermoluminescence $\alpha$-$Al_2O_3$:C__* Radiat. Prot. Dosim 65, 263–266 (1996), the disclosure of which is incorporated herein by reference) has shown that $\alpha$-$Al_2O_3$:C offers many of the favorable properties that one would desire in a UV dosimeter. For example, this material is a sensitive TL radiation detector and it displays a PTTL sensitivity to wavelengths in the UVB range that, along with other desirable properties, make it potentially a versatile base upon which to construct a UVB dosimeter with the desired basic characteristics outlined above.

In addition to its favorable TL and PTTL properties, however, it has been demonstrated in the literature that this material is a sensitive optically stimulated luminescence (OSL) radiation detector (see, for example, Bøtter-Jensen, L. and McKeever, S. W. S., *Optically Stimulated Luminescence Dosimetry Using Natural and Synthetic Materials,* Radiat. Prot. Dosim. 65, 273–280 (1996), the disclosure of which is incorporated herein by reference). In the OSL mode of operation, a sample previously irradiated with gamma or beta radiation will luminesce when illuminated with light in the visible range of wavelengths. The luminescence signal is termed OSL and several illumination methods are available, including continuous or steady-state illumination (cw-OSL), pulsed illumination (POSL), and linearly modulated illumination (LM-OSL). Among the many advantages of using an optical stimulation method rather than a thermal stimulation method are that the need for heating the sample is removed. Therefore, the devices that read the luminescence emission require less electrical power to operate; and, most importantly, by stimulating the luminescence emission at low temperature (specifically, ambient temperature) the problem of thermal quenching of the luminescence is avoided. Thermal quenching in $\alpha$-$Al_2O_3$:C is an effect in which the luminescence efficiency decreases as the temperature increases (see, Akselrod, M. S., Whitley, V., Agersnap Larsen, N., and McKeever, S. W. S., *Thermal Quenching of Luminescence from Aluminum Oxide,* J. Appl. Phys. 84, 3364–3372 (1998), the disclosure of which is incorporated herein by reference). Thus, not only is $\alpha$-$Al_2O_3$:C known to be one of the most sensitive TL phosphors currently available, but it is even more sensitive, in terms of luminescence output per unit absorbed radiation dose, when used as an OSL phosphor.

Thus, it should be clear to those familiar with the UV dosimetry arts that there is, and has been for some time, a need to develop a small, portable, integrating dosimeter capable of sensitively measuring doses of absorbed UVB radiation. Additionally, the resulting dosimeter should be capable of measuring integrated UVB exposures of durations ranging from a few minutes to several days of total exposure with a near-linear response to the total UV exposure. Further, the dosimeter should be capable of measuring UVB exposure in either air or water. Still further, the UV radiation to which the dosimeter has been exposed should be determinable via either a TL technique or an OSL technique. Even further, the dosimeter should exploit the many advantages of using $\alpha\text{-}Al_2O_3$:C as a UV detecting material. Accordingly, it should be recognized, as was recognized by the present inventors, that there exists, and has existed for some time, a very real need for a device that exhibits the various characteristics described above.

Before proceeding to a detailed description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a first aspect of the instant invention, there is provided a dosimeter which measures absorbed ultraviolet-B radiation dose for light wavelengths centered at 307 nm and which is based on the phenomenon of the phototransferred luminescence properties (either PTTL, or PT cw-OSL) of $\alpha\text{-}Al_2O_3$:C. In the preferred embodiment $\alpha\text{-}Al_2O_3$:C detectors (either in the form of single crystals, thin powder layers on a suitable substrate, polycrystalline chips, or any other form of $\alpha\text{-}Al_2O_3$:C, including amorphous $\alpha\text{-}Al_2O_3$:C) are used as the UVB detector. The dosimeter formed therefrom can be used in air or water, and will have a near-linear response with a dynamic range of approximately four decades (over an energy fluence range from about $10^2 \, \mu J/cm^2$ to about $10^6 \, \mu J/cm^2$). Further, this device exhibits very little temperature dependence in the region of most interest to biological studies (273 K–323 K). The preferred design of the instant dosimeter incorporates a narrow band optical filter, such as an interference filter, to limit the wavelengths of light that reach the dectector. The inherent angular dependence of these sorts of filters is partially offset through the use of diffusers and by the wavelength dependence of the phototransferred luminescence efficiency in the UVB wavelength range and the shift in the transmission wavelength of the filter as a function of incident angle.

According to a second aspect of the instant invention, there is provided a method of preparing detector materials for use in UV detection. By way of general background, operation of the instant device can be explained by reference to the TL properties of $\alpha\text{-}Al_2O_3$:C. When heated after gamma or beta irradiation, TL is emitted from this material, with a peak of luminescence intensity at temperatures of about 465 K. This effect is due to the thermal release of trapped charge at defects descriptively termed the shallow or "dosimetry traps". The intensity of the ~465 K TL peak is proportional to the dose of absorbed radiation. More stable traps also exist, which release their trapped electronic charge at temperatures of about 900 K and about 1200 K: the so-called "deep traps". If a gamma or beta irradiated sample is heated to just beyond the 465 K TL peak, the dosimetry traps are thermally emptied, but the charge in the deep traps is still present. If, after cooling back to room temperature, the sample is now exposed once again to ultraviolet light, charge from the deep traps is optically stimulated from those traps and a proportion of the charge is retrapped at the empty dosimetry traps. Thus, on second heating a new TL signal at 465 K is now observed, the intensity of which is proportional to the dose of the UV exposure. This TL signal is referred to as the phototransferred thermoluminescence, PTTL. For a given UV exposure, the intensity of the 465 K PTTL signal can be controlled by varying the initial absorbed gamma or beta dose. The efficiency of the UV-induced phototransfer is dependent upon the wavelength of the UV light. This efficiency has been shown to peak in the UVB wavelength range.

As an alternative to thermal stimulation, a luminescence signal can also be induced by optical stimulation. Instead of heating the sample to record the PTTL signal as was described previously, the sample is illuminated with visible light that includes wavelengths that optically stimulate the charge out of the dosimetry traps, thereby creating a luminescence signal which can be measured and correlated with the amount of UV exposure experienced by the detecting material. Experiments have shown that if the illuminating light is centered on wavelengths in the green-blue region of the spectrum, efficient optical stimulation of charge from the dosimetry traps occurs without significant stimulation of charge from the deep traps. Thus, one can measure a phototransferred OSL signal. Since the preferred mode of operation uses continuous visible light illumination, the induced phototransferred luminescence signal is referred as PT cw-OSL. As a result of these considerations the instant design is based upon either UVB-induced PTTL or PT cw-OSL from $\alpha\text{-}Al_2O_3$:C (although POSL or LM-OSL readout modes could also be employed).

Thus, this aspect of the present invention utilizes the properties of materials such as $\alpha\text{-}Al_2O_3$:C to create a UVB dosimeter that can be read via PTTL or PT cw-OSL—which will be collectively described as "phototransferred luminescence" hereinafter. It should be noted, however, that the OSL readout mode need not be limited to cw-OSL, but rather pulsing (POSL) or linear modulation of the stimulating light (LM-OSL) may also be used, Further, since the underlying physical phenomenon employed is that of measuring the amount of charge that is trapped in the acceptor traps (i.e., how much UV exposure the dosimeter has experienced), any method that provides a measure of this quantity would be acceptable for use with the instant invention.

The foregoing has outlined in broad terms the more important features of the invention so that the detailed description that follows may be more easily understood, and so that the contribution to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

DETAILED DESCRIPTION

Dosimeter Construction

Figure 1:
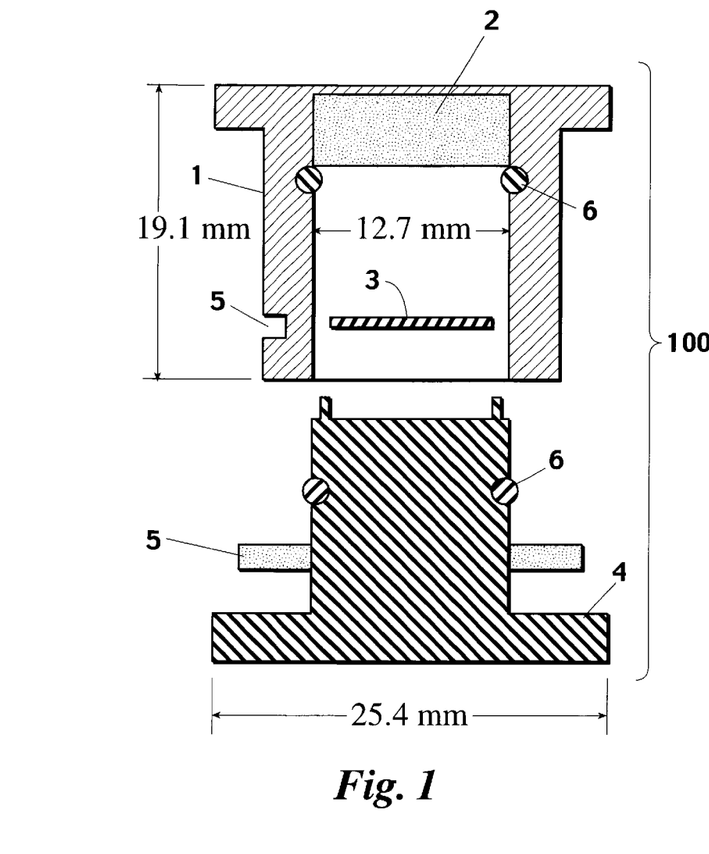
FIG. 1 contains a schematic diagram of the preferred dosimeter, which consists of a Teflon®-type cap 1; an interference filter 2 with a pass band centered at 307 nm; an $\alpha\text{-}Al_2O_3$:C detector 3; a plastic base 4; a bayonet fitting 5; and, O-rings 6.

Turning to FIG. 1, wherein is contained a cross-sectional view of a preferred embodiment of the instant invention, preferred dosimeter 100 consists of a machined Teflon®—like cap 1 and a black Delrin® (or similar) base 4. An interference filter 2 with an optical passband centered at 307 nm is inserted into the cap 1. The base 4 holds the detector 3, which is preferably $\alpha$-Al$_2$O$_3$:C in the form of a single crystal chip or a thin powder layer on a suitable substrate. The dosimeter 100 is preferably closed by first pressing the cap 1 onto the base 4 and twisting to secure with a bayonet fitting 5. The closed dosimeter 100 is thus water tight and light tight, allowing UVB radiation to fall onto the detector only after passing through the cap 1 and the interference filter 2. The detector 3 can be formed of single crystal chips of $\alpha$-Al$_2$O$_3$:C, of typical dimensions 5 mm diameter and 1 mm thick, or may consist of a thin layer of $\alpha$-Al$_2$O$_3$:C powder (for example, 7–9 mg/cm$^2$, grain size 38–53 $\mu$m prior to pressing) pressed onto an aluminum substrate without binding material.

The cap 1 forms the upper portion of the dosimeter 100. A first purpose of this member is to protect the interior of the dosimeter 100—and its filter 2 and detector 3—from contaminants originating in the external environment, e.g., from invasion by water, dirt, etc. However, the cap 1 must be thin enough on its upper surface to permit transmission of some amount of light therethrough, otherwise radiation would not be able to reach the enclosed detector 3. In the preferred embodiment, the cap 1 will be constructed of a thermoplastic resin such as Teflon®, although other variations are certain possible and within the skill of those of ordinary skill in the art. In the text that follows, the term "plastic" will be used in its broadest sense to include the family of plastics and other moldable materials that are at least translucent and can be shaped into the requisite form. As discussed more fully hereinafter, a second broad purpose of the cap 1 is to diffuse or scatter ambient radiation passing therethrough. This, as discussed below, can help reduce the dependence of the recorded signal to the angle at which light falls on the detector 3. Needless to say, the upper surface of the cap 1 should be chosen to be relatively transparent with respect to the wavelength of UV radiation which it is desired to measure.

The interference filter 2 is well known to those skilled in the art as an optical filter in which the light wavelengths that are not transmitted are removed by interference phenomena rather than by absorption or scattering. One advantage of this sort of filter is that it can be made to transmit a very narrow band of wavelengths and, thus, can be used as a monochromator when it is desired to examine, say, a radiation source at the wavelength of a single spectrum line. It should be noted, though, that although an interference-type filter is the preferred choice for use with the instant invention, any narrow pass-band optical filter would be suitable for use with the instant invention, where "filter" should be understood to include individual optical filters as well as combinations of filter elements that yield a narrow pass band. Thus, in the text that follows the term "interference" filter will be used to describe, not only conventional interference filters, but more generally any narrow band optical filter.

The detector 3 preferably consists of a thin layer of luminescent material that is deposited on a suitable substrate, or sandwiched between thin films of (say) transparent or translucent plastic. The role of the luminescent material is described more fully below, but in general this material must respond to—and be sensitive to—exposure to at least the particular radiation wavelength that is being investigated. Further, the magnitude of this response and, hence, the degree of exposure, must be determinable after-the-fact. In the preferred embodiment, the luminescent material is $\alpha$-Al$_2$O$_3$:C, a material that is in many ways the best choice for the instant detector 3. Among the properties that make $\alpha$-Al$_2$O$_3$:C particularity suitable for use in the instant invention are that its shallow traps are stable at ambient temperatures and can be "read" using either thermal stimulation (at temperatures between about 100° C. and 500° C.) or optical stimulation (with light in the wavelength range of about 350 nm to 900 nm).

The previous paragraphs have described only one preferred embodiment, other arrangements may be devised by those skilled in the art and, in fact, the precise details of the construction of the $\alpha$-Al$_2$O$_3$:C detector 3 are not a part of the instant invention. It should also be mentioned that it is not the intent of the instant inventors to limit the invention to the use of $\alpha$-Al$_2$O$_3$:C as the detector material: any material with similar phototransferred luminescence sensitivity when exposed to wavelengths in the UV region could be used within the instant dosimeter 100. Thus, when the chemical compound $\alpha$-Al$_2$O$_3$:C is written herein, it should be understood that that usage stands for, not only the specific compound, but also any material with similar phototransferred luminescence sensitivity within the UV band.

Further, the response of the dosimeter should not be considered as being limited to 307 nm, or even to UVB wavelengths. By choice of a different interference filter 2 the dosimeter could be used to provide a UVB response at a different wavelength or wavelengths, subject to the efficiency of the phototransfer process over the chosen wavelength range. (See, for example, the previously cited work by the instant inventors, i.e., Colyott, Akselrod, and McKeever, 1996).

Detector Preparation

According to another aspect of the instant invention, there is provided a method of detector 3 preparation which preferably begins with a period of pre-irradiation, preferably at room temperature, to a dose, D (typically 1–100 Gy) using either a $^{60}$Co gamma source or a $^{90}$Sr beta source. The detector 3 is then preheated in order to remove the charge trapped at the dosimetry traps. A typical prescription for the preheat phase is to heat it to 625 K at 20 K/s for 1 hour, and then to continue to heat at 10 K/s to 675 K for 12 minutes.

Of course, other preheat schedules may be devised by those skilled in the art and the one given here was selected for purposes of illustration only.

If $\alpha$-$Al_2O_3$:C single crystal detectors are used in the dosimeters as the detecting material, then the detectors 3 can be reused repeatedly, provided they are annealed at a temperature of about 1200 K between exposures. This heating removes charge carriers from all known traps, it being well known that the deep traps are thermally stable up to about 1200 K. Of course, using heat to remove the charge carriers from luminescent material deposited on thin-layer detectors can be somewhat problematic, as the substrate may have a melting point which is lower than the preferred annealing temperature. For example, consider a detector formed by depositing powdered $\alpha$-$Al_2O_3$:C on an aluminum substrate. Since aluminum has a melting point of 933 K, which is well below the preferred annealing temperature of powdered $\alpha$-$Al_2O_3$:C, this detector cannot be heated to the annealing temperature without destroying the it. However, if single crystals, polycrystals, or amorphous materials are used as the preferred eluminescent material, this problem can be largely avoided.

However, if a thin-layer detector is desired, a different scheme is available. A "weak beam calibration" method was devised by the instant inventors which may be used to reset the thin-layer detectors if one wishes to reuse them. The preferred weak beam calibration procedure is as follows. Each sample is irradiated with a gamma or beta dose of, typically, 30 Gy, and is then heated to about 600 K for 2 minutes, cooled to room temperature, and illuminated with a "weak beam" (0.250 $\mu W \cdot cm^{-2}$) of 307.0 nm light for 10 minutes. This procedure phototransfers a small fraction of the charge from the deep traps and produces a relatively small phototransferred luminescence signal. During re-use of the dosimeters, each subsequent UVB measurement is then followed by a similar "weak beam calibration" in order to detect any change in the concentration of charge trapped in the deep traps (which act as the source of the charge transferred during UVB illumination). If the weak beam calibration signal indicates a depletion of charge in the source traps, a small "restoration dose" is applied to the detector to bring the calibration signal back to within tolerance (e.g., to within one standard deviation).

After the above-described pretreatment, the detector 3 is ready to be loaded into the dosimeter body 100 as shown in FIG. 1. Exposure to UV will then give rise to the phototransferred luminescence signal (PTTL at ~465 K if stimulated thermally, or PT cw-OSL if stimulated with a continuous beam of visible light). In the measurements of PT cw-OSL the visible light source used in the present experiments was an array of Nichia NSPG500S diodes, with a peak emission at 526 nm. Alternatively, other diodes emitting at different wavelengths may be used.

Detector Calibration Procedure

The instant dosimeter 100 was calibrated using natural sunlight and a Biospherical Instruments model GUV-511C ground-based ultraviolet radiometer. The 305 nm channel was chosen for the calibration measurements and data were recorded every 30 seconds or 60 seconds. Each 30-second (or 60-second) record comprised an average of approximately 100 (or 200) scans of the 305 nm channel. Measurements of the UVB intensity with respect to time-of-day (and, indirectly, the angle of the sun) were made using an Ultraviolet Products model UVX-31 radiometer. Intensity readings were made on the same day, recorded every 30 seconds for a total of about 30 minutes and then integrated.

Each dosimeter 100 was calibrated by exposing it to natural sunlight for amounts of time ranging from 2 to 6000 minutes. The detectors 3 were then removed from the dosimeter bodies 100 and the phototransferred luminescence was measured. In the preferred embodiment, the luminescence is detected using a photomultiplier tube using appropriate optical filtration to remove undesired wavelengths. For example, if the material used is $\alpha$-$Al_2O_3$:C, one can use an optical filter (or combination of filters) with a narrow transmission band centered at 420 nm to select only that luminescence which results from the de-excitation of excited F-centers within the $\alpha$-$Al_2O_3$:C lattice. In the event that some other material has been used, the previous arrangement would need to be modified to suit that material according to methods well known in the art. The phototransferred luminescence measurements were then calibrated against the integrated UVB measurements recorded in the 305 nm channel of the GUV-511C ground-based UV radiometer. Normally, an average of three readings using three separate dosimeter/detector combinations was calculated.

The sensitivity of the instant dosimeter to irradiation at non-normal angles of incidence was obtained by positioning the dosimeters 10 mm from a deuterium lamp and illuminating for 10 minutes. Individual luminescence measurements were taken after each rotation of the dosimeter from 0 to 75 degrees, in 15 degree increments. Following each UV exposure, the detector 3 was removed from the dosimeter body and a phototransferred luminescence measurement was taken. After each measurement the detector 3 was heated to 675 K for 1 minute, before being returned to the dosimeter body ready for the next UV exposure.

In making the angular dependence measurements it is important to be aware of any angular dependency introduced by use of the interference filter 2. These measurements were performed using a Varian Corporation CARY 5 UV-VIS-NIR spectrophotometer by varying the angle of the filter with respect to the incident beam in the spectrophotometer.

UVB Dosimeter Response

Figure 2:
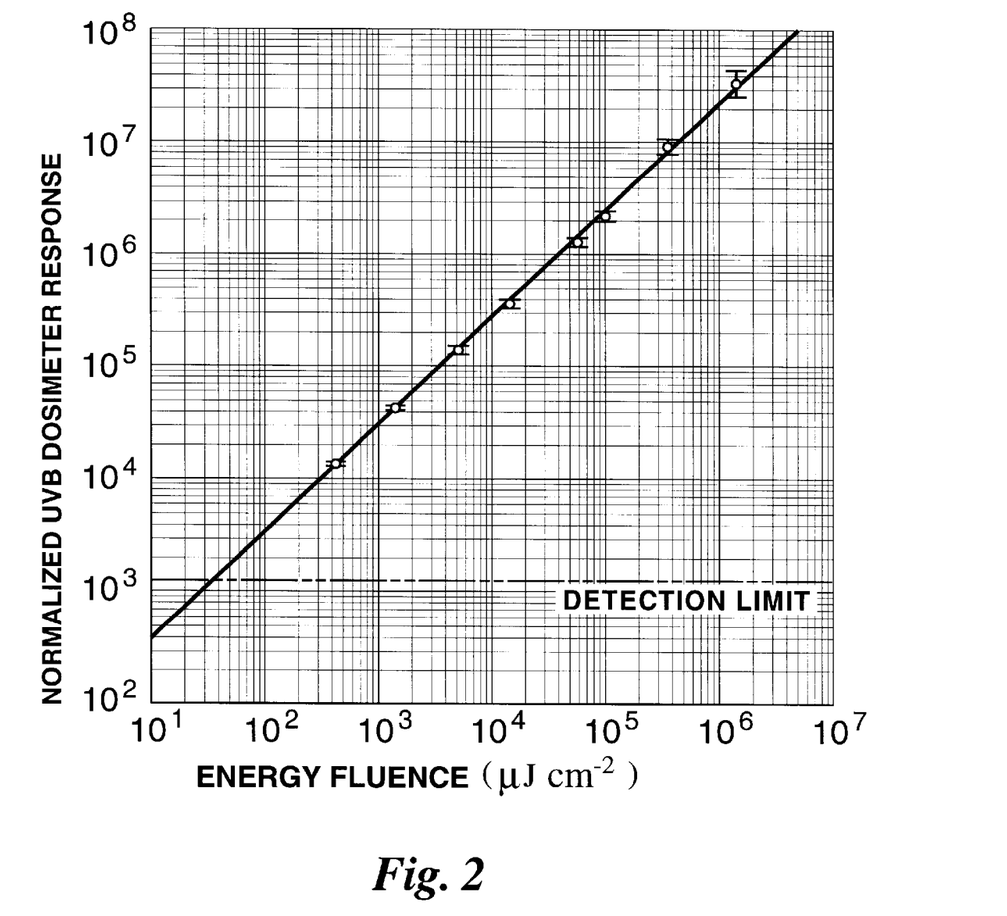
FIG. 2 illustrates the normalized PT cw-OSL response of the instant UVB dosimeter as a function of exposure to natural sunlight. Each datum point is the mean of three PT cw-OSL readings from three dosimeter/detector combinations, all exposed to the same conditions.

A typical UVB response curve for the dosimeter is shown in FIG. 2. This particular data set shows the calibration data for PT cw-OSL using $\alpha$-$Al_2O_3$:C thin-layer detectors. The cw-OSL signal is measured using a 526 nm stimulation source (a diode array). The exposure axis is calibrated using the response of the 305 nm channel of the GUV-511C radiometer. The gamma dose applied was 100 Gy from a $^{60}$Co source at room temperature, and the preheat conditions were 625 K at 20 K/s for 1 hour, and then 675 K for 12 minutes. The figure shows a linear response over almost four orders of magnitude, representing typical sunlight exposures varying from a few minutes to several weeks. This UVB exposure sensitivity can be adjusted by reducing or increasing the initial absorbed gamma dose, or by attenuating the intensity of the incident light.

Angular Dependence

Figure 3:
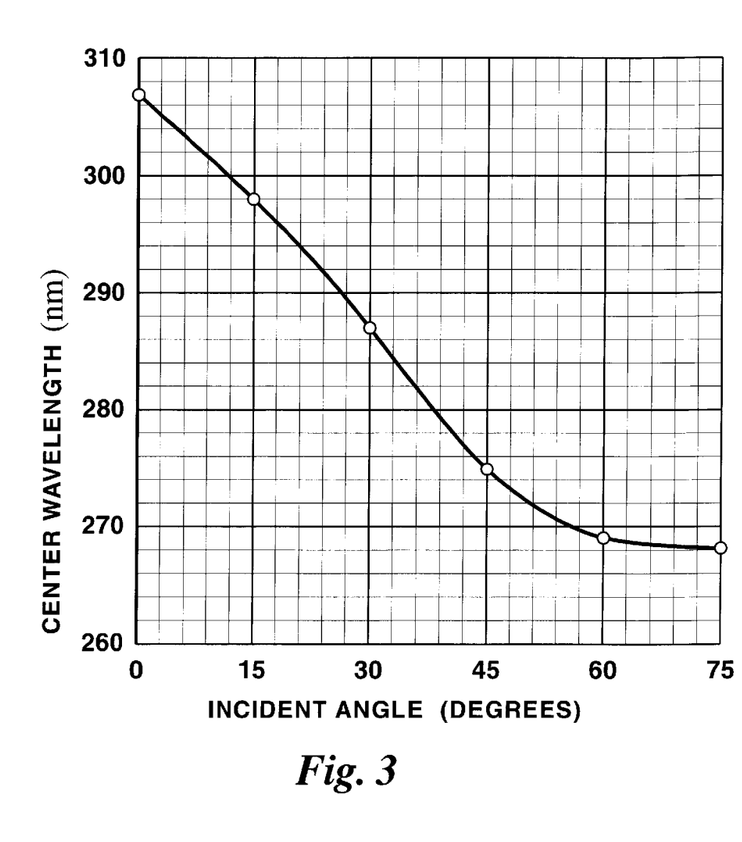
FIG. 3 contains a plot of UVB interference filter central wavelength shift versus incident angle of illumination.
Figure 4:
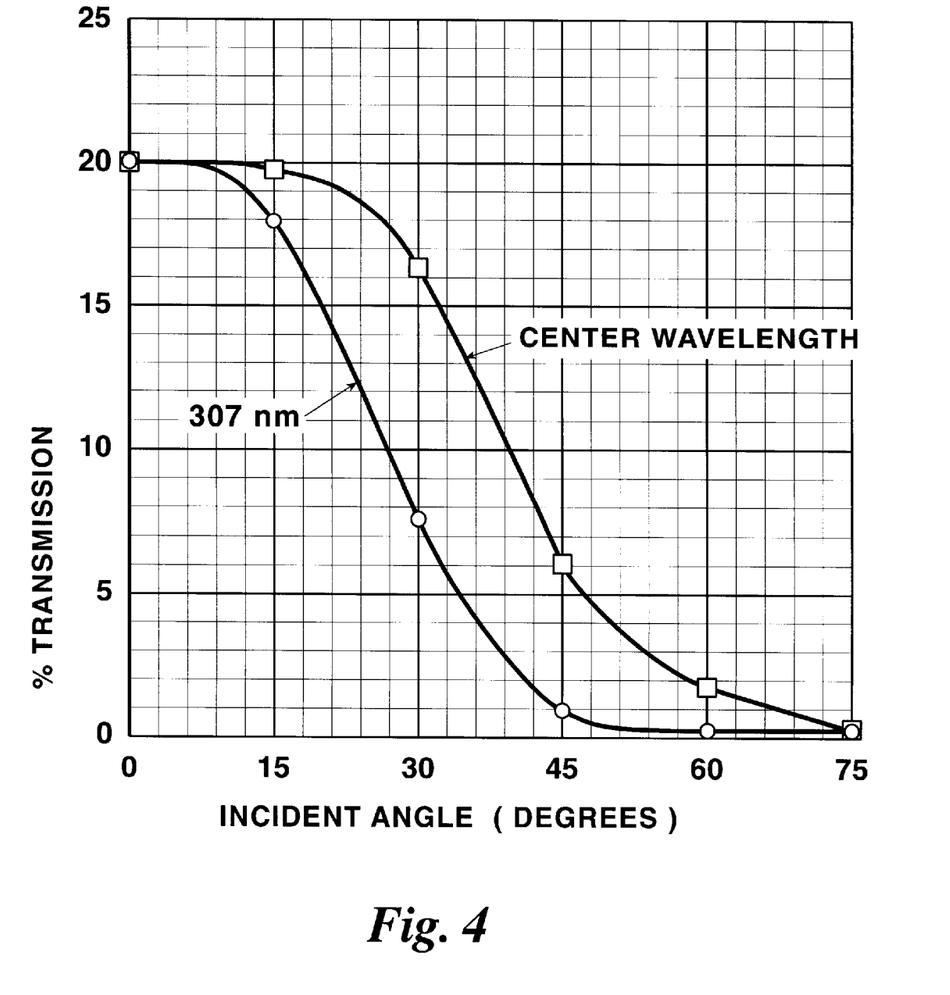
FIG. 4 contains two curves representing the UVB interference filter response versus incident angle of illumination. The filled circles correspond to absorption at 307 nm and the filled squares represent absorption at the central wavelength.
Figure 5:
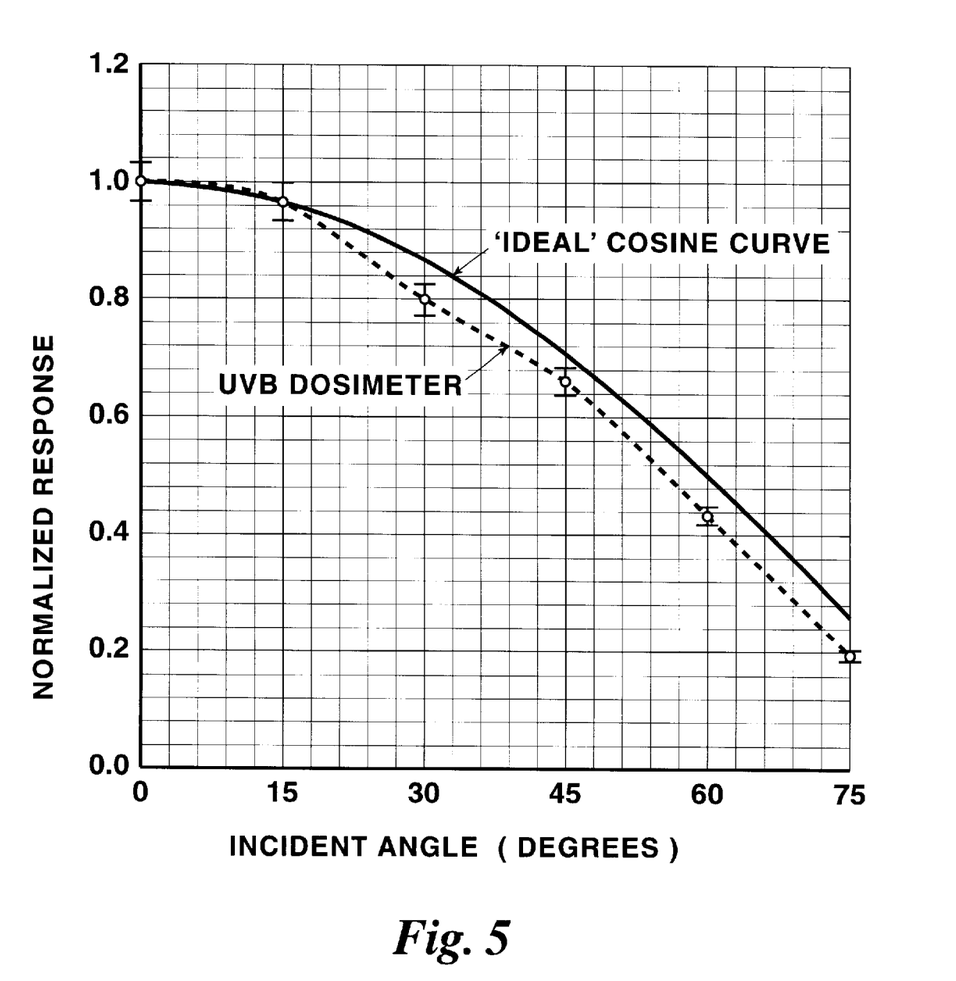
FIG. 5 illustrates the normalized PT cw-OSL response for the UVB dosimeter as a function of incident angle of illumination. Each datum point is the result of a single exposure to a deuterium lamp, using a single dosimeter/detector combination. The solid line shows the 'ideal' cosine response for incident light.

The angular dependence of the dosimeter is an important design and performance consideration. Much of this dependence is dictated by the angular response of the interference filter 2. FIG. 3 shows how the center wavelength of the interference filter transmission curve shifts to lower wavelengths as the incident angle increases. FIG. 4 shows the change in the transmission characteristics at the wavelength of 307 nm and at the center wavelength, as determined from FIG. 3. The angular dependence of the filter properties, as shown in FIGS. 3 and 4, contribute to the angular dependence of the overall dosimeter, which is displayed in FIG. 5. For purposes of comparison, an "ideal" cosine response curve is shown on this same plot. This curve represents the maximum normal component of light possible at a given angle of incidence. Comparing FIG. 4 with FIG. 5 shows that the dosimeter angular response is broader than that of the interference filter 2. One explanation for this effect is that the cap 1 tends to act as a diffuser with respect to light passing through it. Because incident light is scattered (by the upper surface of the cap 1) before it reaches the interference filter 2, the angular "bandwidth" of the incident light is effectively increased. The net result is that the angular distribution of light rays falling upon the interference filter 2 is increased. The composite response of the dosimeter 100 may be represented by a summation of curves similar to those of FIG. 4, with each curve being displaced by some angular amount $\Delta\theta$. The angular dependence of the dosimeter 100 is thereby flattened with respect to that of the interference filter 2. In addition, the efficiency of the phototransfer process changes as the wavelength decreases, with the maximum phototransferred luminescence efficiency occurring near 280 nm. Thus, as the central wavelength of the dosimeter 100 shifts from 307 nm (at 0° with 20% transmission) to 268 nm (at 75° with <1% transmission) the efficiency of charge carrier phototransfer increases. This effect also contributes to the flattening of the dosimeter's 100 angular response.

Temperature Dependence

Figure 6:
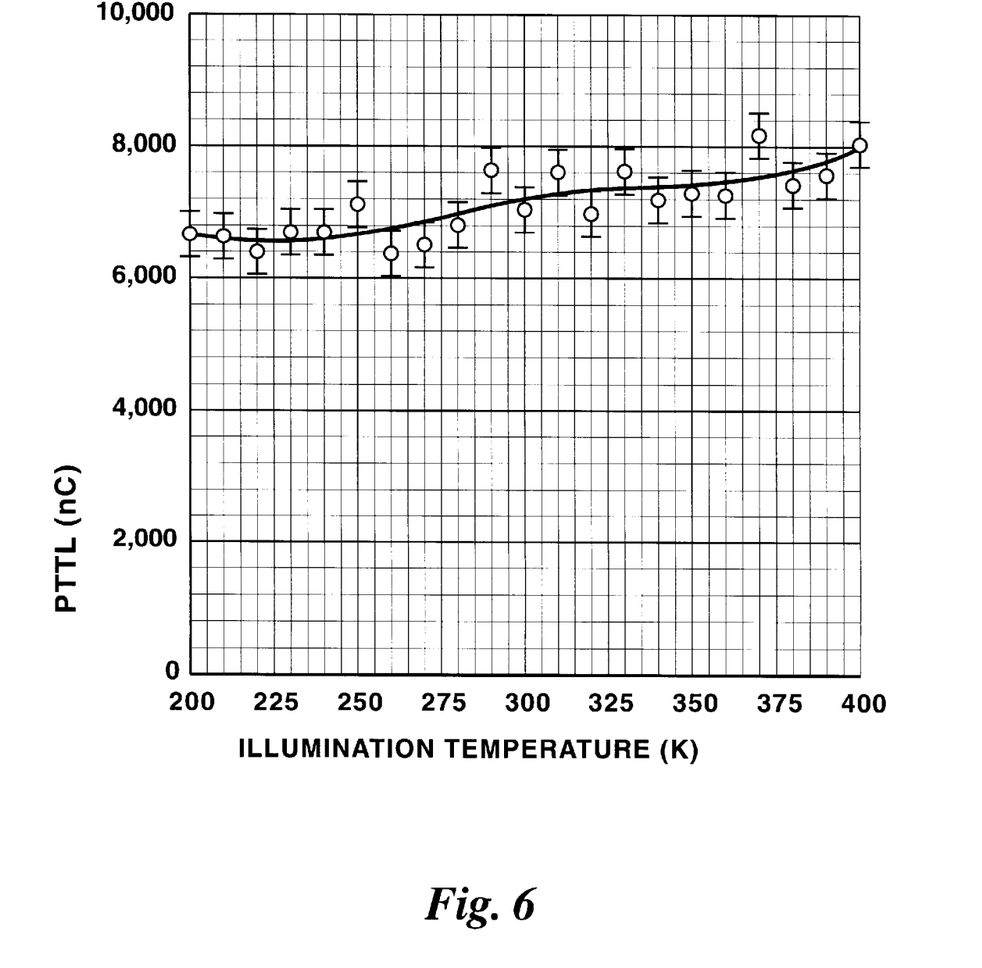
FIG. 6 contains a plot of the efficiency of the PTTL response versus sample temperature during illumination.

FIG. 6 represents the efficiency of the phototransfer process from the deep traps into the dosimetry traps, plotted as a function of the sample temperature during UVB illumination. In this case, the phototransferred luminescence signal is a PTTL signal, although a similar temperature dependence would be expected for the PT cw-OSL signal. The data show that the phototransfer efficiency is essentially constant around room temperature, decreasing by about 10% when the illumination temperature drops below the temperature of a shallow trap (which is known to give rise to a TL peak near 260 K).

Summary

A passive integrating UVB dosimeter with a response preferably centered at 307 nm has been developed by the instant inventors. This dosimeter preferably takes advantage of the UVB-induced phototransferred luminescence efficiency of $\alpha$-$Al_2O_3$:C in the UVB wavelength range. The instant dosimeter can be used in air or in water, and has no significant temperature dependence in the region of interest (273 K–323 K). The response of the dosimeter is consistent with the response that would be expected for light incident through an absorbing medium (the atmosphere). The intrinsic wavelength dependence of the UVB phototransferred luminescence (PTTL or PT cw-OSL) efficiency in $\alpha$-$Al_2O_3$:C and the addition of diffusers help to flatten the inherent angular dependence of the dosimeter design. Further, because the instant dosimeter is of the passive variety it is relatively inexpensive to manufacture and easy to maintain in the field.

Finally, it should be noted that, although the language of the previous disclosure has generally referred to the use of luminescence as a measure of the amount of UV to which the instant device has been exposed, that was done for purposes of specificity only and not out of any intention to limit the invention to that single modality. Although that it is preferable that luminescence produced by either heat or light be used to measure the amount of charge transferred by the UV radiation, it is possible that conductivity (either thermally stimulated conductivity or optically stimulated conductivity) or capacitance (e.g., thermally stimulated capacitance) could be used. In brief, any method that that be used to determine how much charge is trapped in the acceptor traps (i.e., how much UV exposure the dosimeter has experienced) could be used.

While the inventive device has been described and illustrated herein by reference to certain preferred embodiments in relation to the drawings hereto attached, various changes and further modifications, apart from those shown or suggested herein, may be made by those skilled in the art, without departing from the spirit of the inventive concept, the scope of which is to be determined by the following claims.

REFERENCES

The documents that are listed hereinafter are specifically incorporated by reference into this patent application.

Akselrod, M. S. and Gorelova, E. A. *Deep Traps in Highly Sensitive $\alpha$-$Al_2O_3$:C TLD Crystals. Nucl. Tracks Radiat. Meas.* 21, 143–146 (1993).

Akselrod, M. S., and McKeever, S. W. S., A *Radiation Dosimetry System using Pulsed Optically Stimulated Luminescence,* Radiat. Prot. Dosim. 81, 167–176 (1998).

Akselrod, M. S., Whitley, V., Agersnap Larsen, N., and McKeever, S. W. S., *Thermal Quenching of Luminescence from Aluminum Oxide,* J. Appl. Phys. 84, 3364–3372 (1998).

Bøtter-Jensen, L. and McKeever, S. W. S., *Optically Stimulated Luminescence Dosimetry Using Natural and Synthetic Materials,* Radiat. Prot. Dosim. 65, 273–280 (1996).

Buckman, W. G. and Payne, M. R. *Photostimulated Thermoluminescence of Lithium Fluoride as an Ultraviolet Radiation Dosimeter.* Health Phys. 31, 501–504 (1976).

Bulur, E., *An Alternative Technique for Optically Stimulated Luminescence (OSL) Experiments,* Radiat. Meas. 26, 701–709 (1996).

Chakrabarti, K., Mathur, V. K., Abbundi, R. J. and Hill, M. D. *UV Induced Trapping in Powder and in Sintered $CaSO_4$:Tm and $CaSO_4$:Dy.* Radiat. Prot. Dosim. 33, 35–38 (1990).

Chang, S. C. and Su, C. S. *Direct Thermoluminescence of Sintered $ZrO_2$ Pellets Induced by Ultraviolet Radiation.* Nucl. Tracks Radiat. Meas. 20, 511–516 (1992).

Chang, S.-C. and Su, C.-S. *Influence of the Sintering Process of $ZrO_2$ Pellets on Thermoluminescence Induced by Ultraviolet Radiation.* Radiat. Prot. Dosim. 47, 169–172 (1993).

Colyott, L. E., Akselrod, M. S., and McKeever, S. W. S., *An Integrating Ultraviolet-B Dosemeter Using Phototransferred Thermoluminescence from $\alpha$-$Al_2O_3$:C.* Radiation Protection Dosimetry, vol. 72, No. 2, pp. 87–94 (1997).

Colyott, L. E., Akselrod, M. S. and McKeever, S. W. S. *Phototransferred Thermoluminescence $\alpha$-$Al_2O_3$:C__* Radiat. Prot. Dosim 65, 263–266 (1996).

Driscoll, C. M. H., McKinlay, A. F. and Smith, P. A. *Multiple Dose Re-Assessment of Lithium Fluoride by the Ultra-Violet Phototransferred Thermoluminescence Technique.* Radiat. Prot. Dosim. 6, 117–120 (1983).

Fausto, A. M. F., Mol. A. W., Sunta, C. M. and Okuno, E. *Studies on TL of LiF:Mg and/or Cu Exposed to Gamma and UV Rays.* Radiat Prot. Dosim. 51, 211–216 (1994).

Lyman, T. *The Transparency of Air Between 1100 and 1300 Å.* Phys. Rev. 48, 149–151 (1935).

Oberhofer, M. *Dosimetry of Non-Ionizing Radiation.* Radiat. Prot. Dosim. 6, 109–112 (1983).

Okuno, E. and Watanabe, S. *U.V. Induced Thermoluminescence on Natural Calcium Fluoride.* Health Phys. 23, 377–382 (1972).

Potiens, A. J. and Campos, L. L. *Ultraviolet and Laser Radiation Dosimetry Using Phototransferred Thermoluminescence in $CaSO_4$:Dy.* Radiat. Prot. Dosim. 66, 95–96 (1996).

Quintern, L. E., Puskeppeleitm M., Rainer, P., Weber, S., El Naggar, S., Escweiler, U., and Horneck, G. *Continuous Dosimetry of the Biologically Harmful UV-Radiation in Antarctica with the Biofilm Technique.* Photochem. Photobiol. B, 22, 59–66 (1994).

Schayes, R., Brooke, C., Kozlowitz, I. and L'Heureux, M. *Thermoluminescent Properties of Natural Calcium Fluoride.* Proc. $1^{st}$ Int. Conf. on Luminescence Dosimetry, Stanford. CONF 650637, AEC Symposium Series 8 (NTIS, Springfield, Va.) (1967).

Su, C.-S. and Yeh, S.-M. *The Effect of LiF in $Gd_2O_3$:Eu, $Y_2O_3$:Eu, $ZrO_2$:Zn and $ZrO_2$:Er on UV Induced Thermoluminescence.* Radiat. Prot. Dosim. 65, 89–92 (1996).

Su, C.-S. and Yeh, S.-M. *UV Attenuation Coefficient in Water Determined by Thermoluminescence Detector.* Radiat. Meas. 26, 83–86 (1996).

Walker F. D., Colyott, L. E., Agersnap Larsen, N. and McKeever, S. W. S. *The Wavelength Dependence of Light-Induced Fading of Thermoluminescence from $\alpha$-Al2O3:C* Radiat. Meas. 26, 711–718 (1996).

Yeh, S.-H. and Weng, P.-S. *Ultraviolet Radiation Measurement with Neutron Pre-Irradiated Thermoluminescence Dosemeters.* Radiat. Prot. Dosim. 47, 689–692 (1993).

Yeh, S.-M. and Su, C.-S. *UV Induced Thermoluminescence in Rare Earth Oxide Doped Phosphors: Possible Use for UV Dosimetry.* Radiat. Prot. Dosim. 65, 359–362 (1996).

What is claimed is:

1. A method of preparing a luminescent detecting material for use in UVB dosimetry using phototransferred luminescence, wherein said luminescent detecting material comprises an anion-deficient $Al_2O_3$, and wherein said luminescent detecting material has a set of shallow dosimetry traps for trapping electronic charge carriers, which charge carriers may be thermally released from said shallow traps upon heating to a first temperature, and a set of deep traps for trapping electronic charge carriers, which charge carriers may be released from said deep traps upon heating to a second temperature, comprising the steps of:

(a) irradiating said detecting material with a dose of ionizing radiation sufficient to fill said shallow traps and said deep traps with charge carriers;

(b) heating said detecting material to a temperature which is above said first temperature but below said second temperature to affect the release of charge carriers from said shallow traps; and (c) cooling said detecting material to ambient temperature; whereupon, when the detecting material is subsequently exposed to UVB radiation a proportion of said charge carriers will be released from said deep traps to be retrapped in said shallow traps, thereby allowing for the measurement of phototransferred luminescence by thermal or optical stimulation of the release of retrapped charge carriers.

2. The method according to claim 1, wherein said detecting material is an anion-deficient $Al_2O_3$ doped with carbon.

3. The method according to claim 2, wherein said detecting material is in the form of a thin film, single crystal or polycrystalline powder.

4. The method according to claim 2, wherein step (b) is performed at about 600–700 K.

5. The method according to claim 1, wherein step (a) includes irradiating said detecting material with gamma, beta or other ionizing radiation.

6. The method according to claim 5, wherein step (a) includes irradiating said detecting material with a dose of about 1–100 Gy of radiation.

7. The method according to claim 6, wherein step (a) includes irradiating said detecting material with a dose of about 30 Gy of radiation.

8. The method according to claim 1, further comprising:

(d) illuminating said detecting material with a weak beam of light for a predetermined period of time in order to phototransfer a fraction of charge carriers from said deep traps to said shallow traps.

9. The method according to claim 8, further comprising repeating step (d) after said detecting material, once prepared, has been exposed to UVB radiation, to detect any change in the concentration of charge carriers trapped in said deep traps.

10. The method according to claim 9, further comprising administering a restoration dose of irradiation to said detecting material.

11. The method according to claim 8, wherein step (d) includes illuminating said detecting material with said weak beam of light having a wavelength of about 307 nm.

12. A method of preparing the detecting material of claim 1, once exposed to UVB radiation, for further exposure to UVB radiation, comprising the step of:

(a) annealing said detecting material, thereby removing substantially all charge carriers from said shallow traps and said deep traps; and (b) repeating steps (a)–(c) of claim 1.

13. A method of preparing a luminescent detecting material for use in UV dosimetry using phototransferred luminescence, wherein said luminescent detecting material comprises an anion-deficient $Al_2O_3$, and wherein said luminescent detecting material has a set of shallow dosimetry traps for trapping electronic charge carriers, which charge carriers may be released from said shallow traps upon stimulation to a first stimulation energy level, and a set of deep traps for trapping electronic charge carriers, which charge carriers may be released from said deep traps upon stimulation to a second stimulation energy level, comprising the steps of:

(a) irradiating said detecting material with a dose of ionizing radiation sufficient to fill said shallow traps and said deep traps with charge carriers; and (b) stimulating said detecting material to a level which is above said first stimulation energy level but below said second stimulation energy level to affect the release of charge carriers from said shallow traps;

whereupon, when the detecting material is subsequently exposed to ultraviolet light a proportion of charge carriers is released from said deep traps to be retrapped in said shallow traps, thereby allowing for the measurement of phototransferred luminescence by thermal or optical stimulation of the release of retrapped charge carriers.

14. A method of preparing a luminescent detecting material for use in UV dosimetry according to claim 13, wherein said first stimulation energy level corresponds to a first temperature, said second stimulation energy level corresponds to a second temperature, and step (b) comprises the step of heating said detecting material to a temperature which is above said first temperature and below said second temperature.

* * * * *